(12) United States Patent
Shirai et al.

(10) Patent No.: US 6,299,335 B1
(45) Date of Patent: Oct. 9, 2001

(54) VEHICULAR HEAD LAMP

(75) Inventors: Katutada Shirai; Yoshio Suehiro, both of Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/438,173

(22) Filed: Nov. 11, 1999

(30) Foreign Application Priority Data

Nov. 11, 1998 (JP) .................................................. 10-320243

(51) Int. Cl.[7] ........................................................... B60Q 1/06
(52) U.S. Cl. ............................ 362/514; 362/528; 362/515
(58) Field of Search .................................. 362/514, 515, 362/524, 528

(56) References Cited

U.S. PATENT DOCUMENTS

| | | | | |
|---|---|---|---|---|
| 4,843,523 | * | 6/1989 | Nakamura | 362/515 |
| 4,967,318 | * | 10/1990 | Ewert et al. | 362/528 |
| 5,906,431 | * | 5/1999 | Chianale et al. | 362/515 |
| 5,908,239 | * | 6/1999 | Sugimoto | 362/515 |
| 5,993,032 | * | 11/1999 | Herbers | 362/528 |
| 6,113,301 | * | 9/2000 | Burton | 362/515 |

FOREIGN PATENT DOCUMENTS

| | | |
|---|---|---|
| S57-51681 B | 11/1982 | (JP) . |
| H3-26904 A | 3/1991 | (JP) . |
| 84000332 A1 * | 2/1984 | (WO) ................................. 362/514 |

* cited by examiner

Primary Examiner—Sandra O'Shea
Assistant Examiner—Peggy A Neils
(74) Attorney, Agent, or Firm—Koda & Androlia

(57) ABSTRACT

In a vehicular head lamp wherein a synthetic resin reflector having a light source is tiltably supported in a synthetic resin lamp body by an aiming mechanism interposed between the reflector and the lamp body, an elastic engagement strip which projects forwards and has a side surface provided with an engagement concave portion, is formed integrally with an interior of the lamp body, and an engagement convex portion that can engage the engagement concave portion of the lamp body is formed integrally with a back face of the reflector. The engagement convex portion is brought to engage the engagement concave portion so that the engaged engagement convex and concave portions constitute an aiming fulcrum.

3 Claims, 8 Drawing Sheets

FIG. 14-(a)
*PRIOR ART*
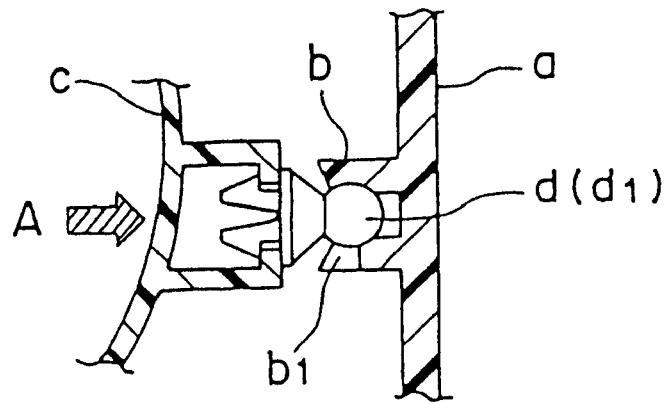
FIG. 14-(b)
*PRIOR ART*
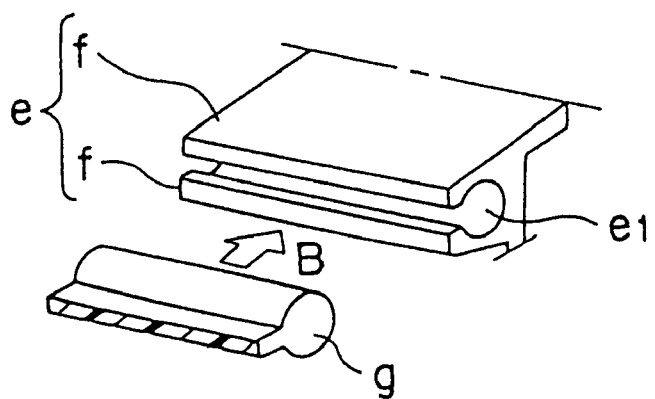

VEHICULAR HEAD LAMP

BACKGROUND OF THE INVENTION

1. Field of the Invention

The present invention relates to a vehicular head lamp and more particularly to a light aiming mechanism of a vehicular head lamp wherein a reflector that has a light source can be adjusted in its aiming angle within a lamp body.

2. Prior Art

FIG. 14(a) shows an aiming fulcrum of an aiming mechanism of a conventional vehicular head lamp which is known as a ball joint structure. This aiming fulcrum is comprised of a ball-receiving portion b, which is provided on a lamp body a, and a ball member d, which is provided on a reflector c and has a ball portion $d_1$ that engages the ball-receiving portion b of a lamp body a. A plurality of longitudinal slits $b_1$, are formed in an opening edge portion of the ball-receiving portion b. In this structure, the ball portion $d_1$, of the reflector c is press-fitted into the ball-receiving portion b from a location in front of the lamp body a as indicated by an arrow A. As a result, the ball-receiving portion b and the ball portion $d_1$, are integrated by such an engagement, and the reflector c is thus mounted in the lamp body a.

FIG. 14(b) shows another type of aiming fulcrum of an aiming mechanism of a conventional vehicular head lamp which is known as a rotational supporting structure. This structure is comprised of a bearing portion e, that has a pair of tongue-like clamping strips f provided on a lamp body, and a shaft member g, that is provided on a reflector so as to engage with the bearing portion e. In this structure, the shaft member g of the reflector is press-fitted into a space between the tongue-like clamping strips f as indicated by an arrow B. As a result, the shaft member g is integrated with a concave portion (supporting portion) $e_1$ of the bearing portion e of the lamp body by such an engagement, and the reflector is mounted in the lamp body.

In the conventional structures of the aiming fulcrum as described above, the direction in which the reflector is inserted (pressed) into the lamp body and the direction in which the supported portion of the reflector (the ball portion $d_1$ and the shaft member g) is press-fitted into the supporting portion (the ball-receiving portion b and the bearing portion c) of the lamp body are the same. In other words, the direction in which the supporting portion and the supported portion, which constitute the aiming fulcrum, engage each other is the same as the direction in which the reflector is mounted (pressed).

Such conventional structures have problems. The supported portion (the ball portion $d_1$, and the shaft member g) of the reflector tends to easily come off of the supporting portion (the ball-receiving portion b and the bearing portion e) of the lamp body, hindering the aiming operation of the vehicle lamp.

SUMMARY OF THE INVENTION

Accordingly, the present invention is to solve the above-described problems with the conventional technology.

The object of the present invention is to provide a vehicular head lamp in which an engagement convex portion of a reflector and an engagement concave portion of a lamp body, which together constituting an aiming fulcrum of an aiming mechanism, are prevented from disengaging from each other after they are engaged and integrated.

The above object is accomplished by a unique structure for a vehicular head lamp wherein a reflector that has a light source is tiltably supported by a synthetic resin lamp body with an aiming mechanism interposed in between, and in the present invention: the lamp body is provided therein with an elastic engagement strip that projects forward, and an engagement concave portion, which extends in a direction substantially perpendicular to a direction in which the reflector is inserted when the reflector is mounted in the lamp body, is formed on the side surface of the elastic engagement strip; the reflector is provided on its back face with an engagement convex portion that engages the engagement concave portion of the lamp body; and the aiming fulcrum of the aiming mechanism is obtained by an engagement between the engagement concave portion of the lamp body and the engagement convex portion of the reflector.

In this structure, since the aiming fulcrum of the aiming mechanism is comprised of the engagement convex portion of the reflector and the engagement convex portion of the elastic engagement strip of the lamp body, the structure of the aiming fulcrum is simple.

Further, the direction in which the engagement convex portion and the engagement concave portion, which together constitute the aiming fulcrum, engage each other is substantially perpendicular to the direction in which the reflector is inserted into the lamp body when the reflector is mounted in the lamp body. Accordingly, the engagement concave portion can securely prevent the engagement convex portion of the reflector, which comes into an engagement with the engagement concave portion, from deviating in a direction in which the reflector is drawn out.

Further, when the engagement convex portion of the reflector is going to be engaged with the engagement concave portion of the lamp body, the reflector is pressed into the lamp body from a location in front thereof so that the engagement convex portion presses the side surface of the elastic engagement strip. When the engagement convex portion is moved to the location of the engagement concave portion, it elastically deforms the elastic engagement strip sideways; and by way of the restoring force of the thus deformed elastic engagement strip, the engagement concave portion and the convex portion are assuredly maintained in engagement with each other.

In the present invention, the engagement concave portion can be cylindrical in shape so as to extend in a direction substantially perpendicular to a direction in which the elastic engagement strip projects, and the engagement convex portion can also be cylindrical in shape so as to fit in the cylindrical engagement concave portion.

With this structure, the cylindrical engagement convex and concave portions, which are fitted with each other, ensure that the engagement convex portion can smoothly rotate at an aiming point without becoming loose.

Furthermore, in the present invention, a tapered guide groove for effecting a smooth engagement between the engagement convex portion and the engagement concave portion is formed at a tip end of the elastic engagement strip.

With this tapered guide groove provided in the elastic engagement strip, the amount of deformation of the elastic engagement strip, that occurs when the engagement convex portion is moved while deforming the elastic engagement strip, can be reduced. Thus, the tapered guide groove can operate as a guide for guiding the engagement convex portion into the engagement concave portion.

Further, in the present invention, the engagement concave portion is formed on a side surface of the elastic engagement strip that is opposite to the side that faces an inner wall of the lamp body.

In the case where the engagement concave portion is formed in the side face of the elastic engagement strip that faces the inner wall of the lamp body, when mounting the reflector, the engagement convex portion of the reflector is pressed along the side surface of the elastic engagement strip that faces the inner wall of the lamp body. When this occurs, the reflector (the engagement convex portion of the reflector) may interfere with the inner wall of the lamp body. To the contrary, in the case where the engagement concave portion is formed in the side wall of the elastic engagement strip that is opposite to the side that faces the inner wall of the lamp body, the engagement convex portion of the reflector is pressed along the side surface of the elastic engagement strip that is opposite to the side facing the inner wall of the lamp body. Accordingly, it is less likely that the reflector (the engagement convex portion of the reflector) interferes with the inner wall of the lamp body.

Furthermore, the elastic engagement strip of the present invention can be designed so as to extend in close proximity to the inner wall of the lamp body.

With this structure, when the elastic engagement strip is deformed beyond a predetermined amount by the engagement convex portion of the reflector, it comes into contact with the inner wall of the lamp body, and the elastic engagement strip is prevented from being further deformed. In other words, the inner wall of the lamp body functions so as to back up the elastic engagement strip, thus preventing an excessive bending moment from being applied to the elastic engagement strip.

In the present invention, it can be designed so that the aiming mechanism is comprised of one screw and two aiming fulcrums, and at least one of the two aiming fulcrums is obtained by the engagement convex portion and the engagement concave portion.

With this structure, the number of parts needed to make the aiming mechanism can be reduced.

BRIEF DESCRIPTION OF THE DRAWINGS

FIGS. 14(a) and 14(b) are explanatory illustrations that show the structures of aiming fulcrums of conventional aiming mechanisms.

DETAILED DESCRIPTION OF THE PREFERRED EMBODIMENTS

Figure 1:
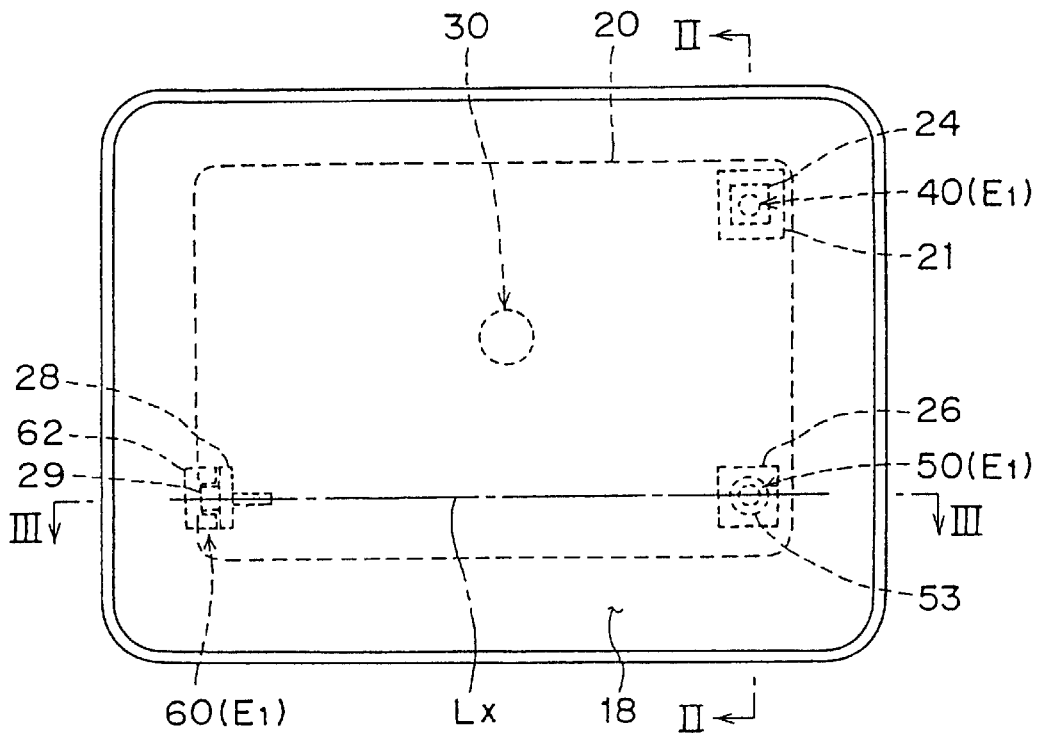
FIG. 1 is a front view of a vehicular head lamp according to the first embodiment of the present invention.

The present invention will be described with reference to various embodiments thereof.

In FIGS. 1 through 5, the reference numeral 10 denotes a container like lamp body which is made of a synthetic resin (e.g. PP (polypropylene); and in this lamp body 10 is mounted a paraboloid reflector 20. The reflector 20 is made of a synthetic resin (e.g. FRP (fiber reinforced plastics) or PPS (poly phenylene sulfide)), and a light bulb 30 that serves as a light source for the head lamp is installed. A front lens 18 is mounted to the front opening of the lamp body 10 so as to be integral with the head lamp.

Figure 2:
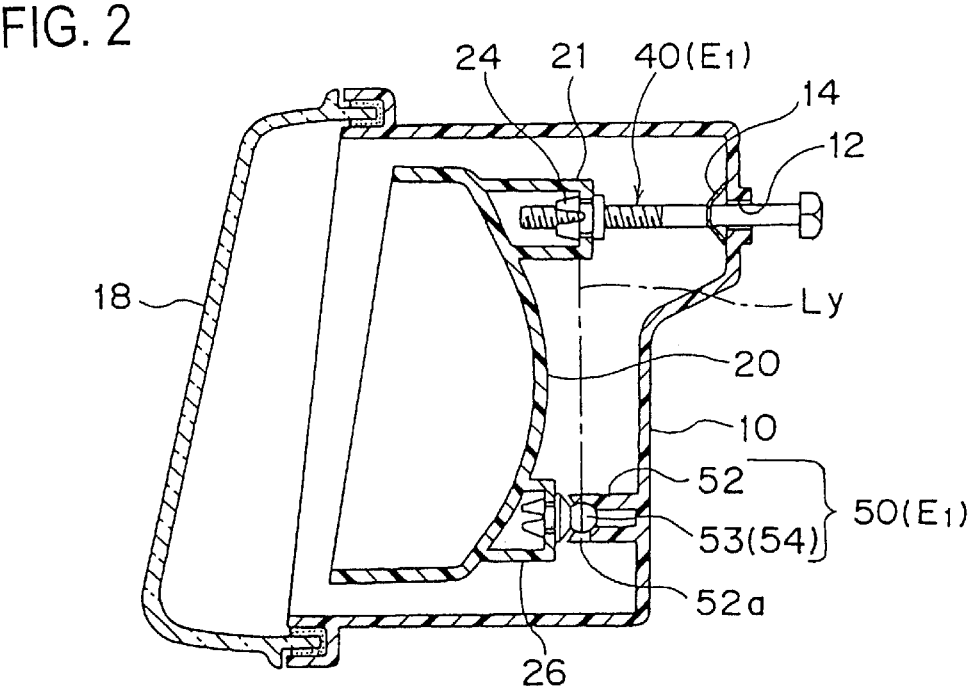
FIG. 2 is a longitudinal sectional view of the head lamp taken along the line II—II of FIG. 1.
Figure 3:
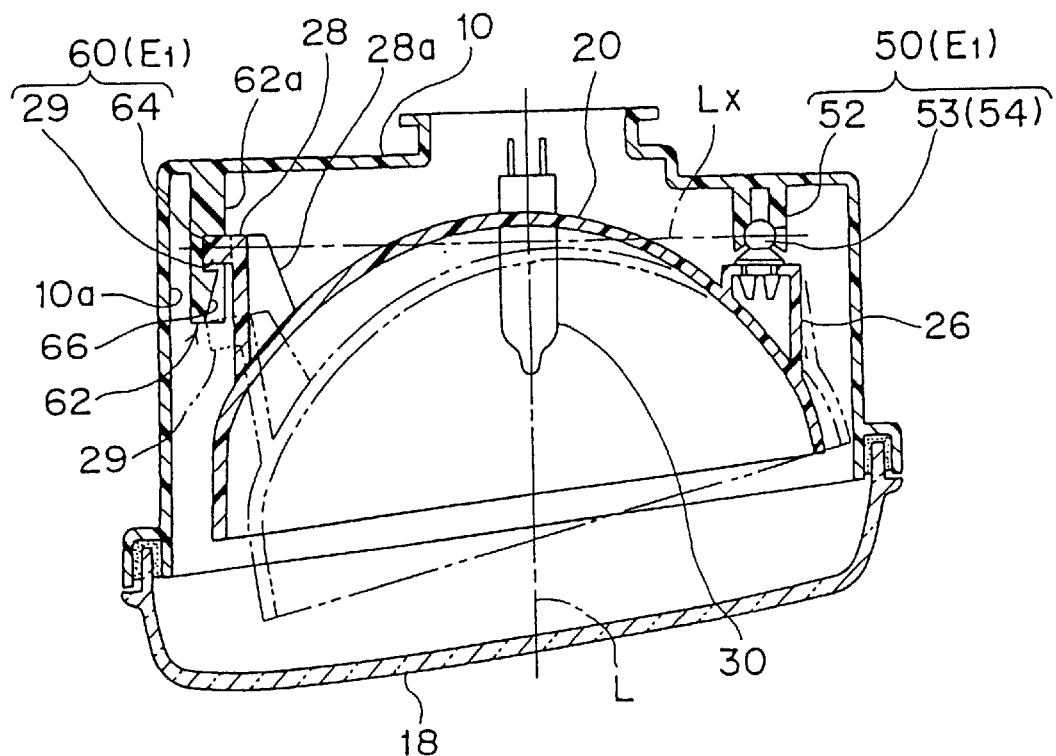
FIG. 3 is a horizontal sectional view of the head lamp taken along the line II—II of FIG. 1.

As shown in FIGS. 1 through 3, the reflector 20 is supported in the lamp body 10 by an aiming mechanism $E_1$ in a manner that the reflector 20 is tiltable in fore-to-aft directions. The aiming mechanism $E_1$ is essentially comprised of an aiming screw 40 and two aiming fulcrums 50 and 60, which are interposed between the reflector 20 and the lamp body 10. The aiming screw 40 is rotatably supported by a screw insertion hole 12 that is formed in a back wall of the lamp body 10 so as to be at a right upper corner (at the right corner when viewed from the front of the lamp body 10 as in FIG. 1). A nut member 24, which is secured to a bracket 21 formed integrally with a back face of the reflector 20, is screwed to the front end of the aiming screw 40 that extends forward (or to the left in FIG. 2).

A ball-receiving portion 52 that constitutes the aiming fulcrum 50 is formed integrally on the back wall of the lamp body 10 at a right lower corner (at the right lower corner when viewed from the front of the lamp body 10 as in FIG. 1) and at a location just under the screw insertion-attachment hole 12. On the other hand, a bracket 26 is formed integrally on the back face of the reflector 20 at a location that corresponds to the ball-receiving portion 52 of the lamp body 10. A ball member 53, which has a ball portion 54 that can engage the ball-receiving portion 52, is secured to the bracket 26. In addition, slits 52a are formed in an opening edge portion of the ball-receiving portion 52 so as to be at a plurality of locations with equal intervals in the circumferential direction of the ball-receiving portion 52. The ball portion 54 of the ball member 53 is press-fitted into the ball-receiving portion 52 from the opening edge portion thereof. A ball joint is thus constituted, which is the aiming fulcrum 50 comprised of the ball portion 54 integrally engaging the ball-receiving portion 52.

Further, an elastic engagement strip 62 is formed integrally on the back wall of the lamp body 10 so as to be located at a left lower corner (at the left lower corner when viewed from the front of the lamp body 10 in FIG. 1). The elastic engagement strip 62 has a rectangular cross-sectional shape and projects forward (to the bottom in FIG. 3). In addition, a cylindrical engagement concave portion 64 that extends perpendicularly to a direction in which the elastic engagement strip 62 projects (see FIG. 4) is provided on a side surface 62a of the elastic engagement strip 62. The side surface 62a is located on the side opposite to a side that faces a side wall 10a which is an inner wall of the lamp body.

On the other hand, a bracket 28 is formed integrally on the back face of the reflector 20 so that the bracket 28 positionally corresponds to the elastic engagement strip 62. The bracket 28 has a cylindrical engagement convex portion 29 that can engage the engagement concave portion 64. The reference numeral 28a is a horizontal rib formed between the bracket 28 and the reflector 20 so as to reinforce the bracket 28.

In the above structure, the engagement convex portion 29 of the reflector 20 is fitted to the side surface 62a of the elastic engagement strip 62 from a location in front of the elastic engagement strip 62. The bracket 28 (that has the engagement convex portion 29) is pressed as indicated by an arrow in FIG. 5, while elastically deforming the elastic engagement strip 62 of the lamp body 10 outward (toward the side wall 10a of the lamp body 10). Thus, the aiming fulcrum 60 that is composed of the engagement convex portion 28 integrally engaging the engagement concave portion 64 is obtained.

As seen from the above, the aiming fulcrums 50 and 60 cooperate with each other and constitute a horizontal tilt fulcrum of the aiming mechanism $E_1$. As a result, when the aiming screw 40 is turned, the nut member 24 is moved forward and backward (right and left in FIG. 2) along the aiming screw 40; and in response to this movement of the nut member 24, the reflector 20 tilts about a horizontal tilt axis Lx that passes through the aiming fulcrums 50 and 60. Thus, it is possible to tiltably adjust (perform aiming of) an optic axis L of the head lamp in up-and-down directions in FIG. 1.

In the above structure, the center axis of the cylindrical engagement concave portion of the elastic engagement strip 62 passes through the center of the ball-receiving portion 52. Also, the center axis of the cylindrical engagement convex portion 29 passes through the center of the ball portion 54 of the ball member 53. Accordingly, it is ensured that the reflector 20 can smoothly tilt around the horizontal tilt axis Lx.

Figure 4:
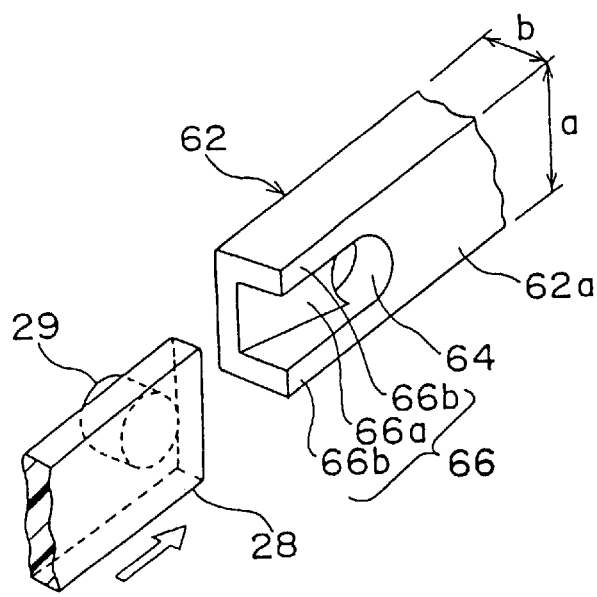
FIG. 4 is an enlarged exploded perspective view of an aiming fulcrum component of an aiming mechanism of the head lamp.

Furthermore, as shown in an enlarged scale in FIG. 4, a tapered guide groove 66, which slantingly extends from an edge portion to the engagement concave portion 64, is provided at the tip end of the side surface 62a of the elastic engagement strip 62 of the lamp body 10. The guide groove 66 has a U-shaped cross-section, and horizontal guide portions 66b are formed on both sides of the tapered surface 66a so as to face each other. When the engagement convex portion 29 of the reflector 20 engages the engagement concave portion 64 of the lamp body 10, the tapered surface 66a can reduce an amount of displacement of the elastic engagement strip 62, and the tapered surface 66a and the horizontal guide portions 66b can smoothly guide the engagement convex portion 29 of the reflector 20 into the engagement concave portion 64 of the lamp body 10.

If the elastic engagement strip 62 has no tapered surface 66a, when the engagement convex portion 29 is brought so as to engage the engagement concave portion 64, the amount of displacement of the elastic engagement strip 62 tends to be large. As a result, the bending moment applied to the elastic engagement strip 62 becomes correspondingly larger. However, in the shown embodiment, since the tapered surface 66a is provided, the amount of displacement of the elastic engagement strip 62 can be small by the inclination of the tapered surface 66a. As a result, the elastic engagement strip 62 is correspondingly less likely to break. Further, when the engagement convex portion 29 is brought to engage the engagement concave portion 64, the engagement convex portion 29 is smoothly guided by the guide groove 66 (the upper and lower horizontal guide portions 66b) into the engagement concave portion 64. Thus, the engagement convex portion 29 engages the engagement concave portion 64 by merely pressing the bracket 28 of the reflector 20 into the elastic engagement strip 62 of the lamp body 10.

Figure 5:
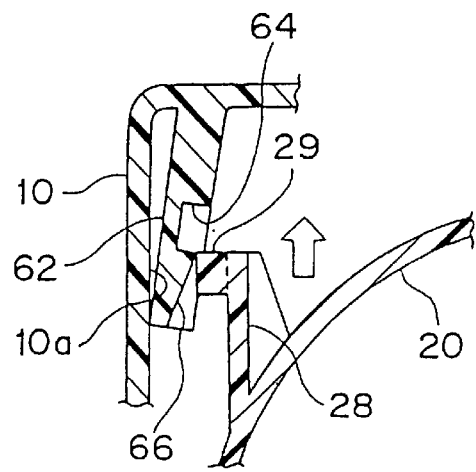
FIG. 5 is an explanatory illustration that shows how an engagement convex portion of a reflector engages an engagement concave portion of an elastic engagement strip of a lamp body.

Further, the elastic engagement strip 62 is provided in close proximity to the side wall 10a of the lamp body 10. As shown in FIG. 5, if the elastic engagement strip 62 is deformed beyond a predetermined amount when the engagement convex portion 29 is brought to engage the engagement concave portion 64, the tip end portion of the elastic engagement strip 62 comes into contact with the side wall 10a of the lamp body 10. As a result, the elastic engagement strip 62 is prevented from being further deformed so as not to break. In other words, the side wall 10a of the lamp body serves as a back up of the elastic engagement strip 62 and prevents an excessive bending moment from being applied to the elastic engagement strip 62.

Next, a process for mounting the reflector 20 in the lamp body 10 through the aiming mechanism $E_1$ is described below.

First of all, the aiming screw 40 is inserted into the screw insertion hole 12 from behind, and a push-on fixture 14 is used so that it holds the aiming screw 40 in position in fore-to-aft directions of the screw insertion hole 12.

In addition, the nut member 24 and the ball member 53 are set in the brackets 21 and 26 of the reflector 20, respectively. The reflector 20, which is integrated with the nut member 24 and the ball member 53, is inserted into the lamp body 10 from the front opening thereof.

At this moment, first of all, the right lower corner portion of the reflector 20 is pressed into the lamp body 10 with the ball portion 54 of the ball member 53 fitted to the ball-receiving portion 52 of the lamp body 10. Thus, the ball portion 54 of the reflector engages the ball-receiving portion 52 of the lamp body 10. Thus, the right lower corner portion of the reflector 20 (see FIG. 1) is supported by the aiming fulcrum 50.

Then, as indicated by dotted imaginary lines shown in FIG. 3, the engagement convex portion 29 of the reflector 20 is fitted to the tapered guide groove 66 of the elastic engagement strip 62 of the lamp body 10. Also, the left lower corner portion of the reflector 20 is pressed into the lamp body 10. As a result, the engagement convex portion 29 of the reflector 20 is brought into an engagement with the engagement concave portion 64 of the lamp body 10 by means of elasticity of the elastic engagement strip 62. Thus, the left lower corner portion of the reflector 20 is supported by the aiming fulcrum 60.

Lastly, the reflector 20 is tilted backward around the horizontal tilt axis Lx, and an upper edge of the reflector 20 is pressed into the lamp body 10. With the rear end of the nut member 24 of the reflector 20 (or to the bracket 21 of the reflector 20) pressed onto the tip end of the aiming screw 40, the aiming screw 40 is turned so that the nut member 24 is screwed to the aiming screw 40. Thus, the right upper corner portion of the reflector 20 is supported by the aiming screw 40, and the reflector 20 is supported by the aiming mechanism $E_1$ (that comprises the aiming fulcrums 50 and 60 and the aiming screw 40).

The elastic engagement strip 62 is designed so as to have a predetermined shape that satisfies two requirements: a smooth mounting of the reflector 20 in the lamp body 10 and a secure supporting of the reflector 20.

More specifically, the reflector 20 is supported on its right side (on the right side when viewed from the front of the reflector 20) by both the aiming screw 40 and the aiming fulcrum 50, and the reflector 20 is supported on its left side only by the aiming fulcrum 60. As a result, the weight load applied to the aiming fulcrum 60 is almost twice as large as the weight load applied to the aiming fulcrum 50. Therefore, the elastic engagement strip 62 that constitutes the aiming fulcrum 60 is especially required so as to have a sufficient rigidity. In the shown embodiment, as seen from FIG. 4, the elastic engagement strip 62 is designed so as to have a rectangular cross-section with its length a being greater than its width b, and the cross-section of the elastic engagement strip 62 is designed so as to have a U-shape at its tip end. As a result, in left-and-right (or lateral) directions in which the elastic engagement strip 62 is deformed without suffering strong resistance, the elastic engagement strip 62 has a sufficient elasticity, so that the engagement convex portion 29 can smoothly engage the engagement concave portion 64. On the other hand, in up-and-down (or vertical) directions in which the weight load of the reflector 20 is effective, the elastic engagement strip 62 has a rigidity sufficient enough to protect itself from deformation and fatigue.

In order to remove the reflector 20 from the lamp body 10, first, the aiming screw 40 is turned so that the screw 40 is unscrewed from the nut member 24 and the reflector 20 is released from being supported by the aiming screw 40.

Next, when the right lower portion of the reflector 20 is pulled forward (to the left in FIG. 2), the ball portion 54 of the reflector 20 is forcibly pulled out of the ball-receiving portion 52 of the lamp body 10. As a result, the reflector 20 is released from the aiming fulcrum 50, and the right side of the reflector 20 is removed from the aiming mechanism $E_1$.

Lastly, the entire reflector 20 is moved rightward (to the right in FIG. 3), so that the engagement convex portion 29 is pulled out of the engagement concave portion 64 of the lamp body 10. In case there is no room to move the lamp body 10 rightward (or sidewise) within the lamp body 10, the left lower corner of the reflector 20 is pressed leftward, and the right side of the reflector 20 is turned forward in the horizontal direction with the elastic engagement strip 62 being deformed. The engagement convex portion 29 is thus pulled out of the engagement concave portion 64. In this manner, the reflector 20 is released from the aiming fulcrum 60.

With the above steps, the reflector 20 is completely separated from the aiming mechanism $E_1$ and can be removed from the lamp body 10.

Figure 6:
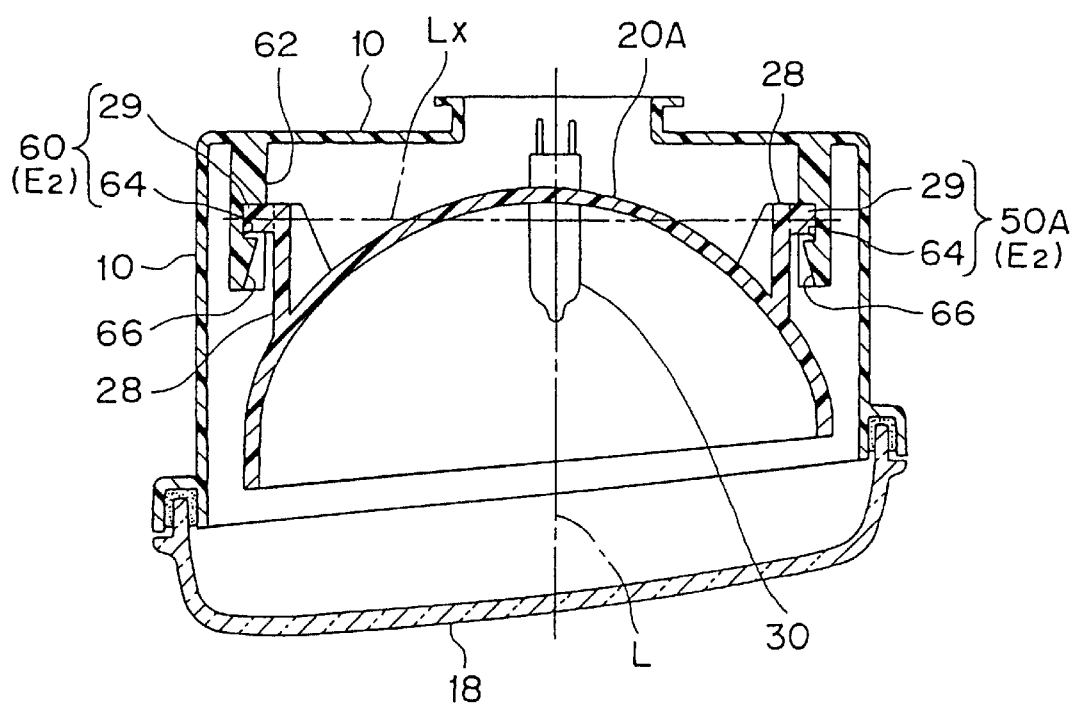
FIG. 6 is a horizontal sectional view of a vehicular head lamp according to the second embodiment of the present invention.

FIG. 6 shows a second embodiment of the present invention. FIG. 6 corresponds to FIG. 3 of the first embodiment shown in FIGS. 1 through 5.

In the first embodiment, one of the two aiming fulcrums 50 and 60, that is, the aiming fulcrum 60, is formed by the engagement convex portion 29 of the reflector 20 and the engagement concave portion 64 formed in the elastic engagement strip 62 of the lamp body 10; and the other aiming fulcrum 50 is composed of the ball joint. However, in the second embodiment shown in FIG. 6, each of two aiming fulcrums 50A and 60 is composed of the engagement convex portion 29 of the reflector 20 and an engagement concave portion 64 formed in the elastic engagement strip 62 of the lamp body 10.

The other components of the second embodiment are the same as those of the first embodiment; and they are denoted by the same reference numerals as in the first embodiment and are not described.

In the second embodiment, since the ball member 53 (see FIG. 3) composed of the ball joint is unnecessary, the number of components that constitute the aiming fulcrum component is reduced, and the construction of the aiming mechanism $E_2$ is simplified correspondingly.

When mounting the reflector 20 in the lamp body 10 using the aiming mechanism $E_2$, each of the engagement convex portions 29 of the reflector 20 is fitted to each of the tapered guide grooves 66 of the elastic engagement strips 62 of the lamp body 10. Then, the reflector 20 is pressed into the lamp body 10 (upward in FIG. 6) so that the engagement convex portions 29 of the reflector 20 are caused to engage the engagement concave portions 64 respectively by elasticity of the elastic engagement strips 62 of the lamp body 10. Thus, the reflector 20 is easily supported by the aiming fulcrums 50A and 60. After that, as in the first embodiment, the aiming screw 40 (not shown) is turned, and the nut member 24 (not shown) is screwed to the aiming screw 40.

Figure 7:
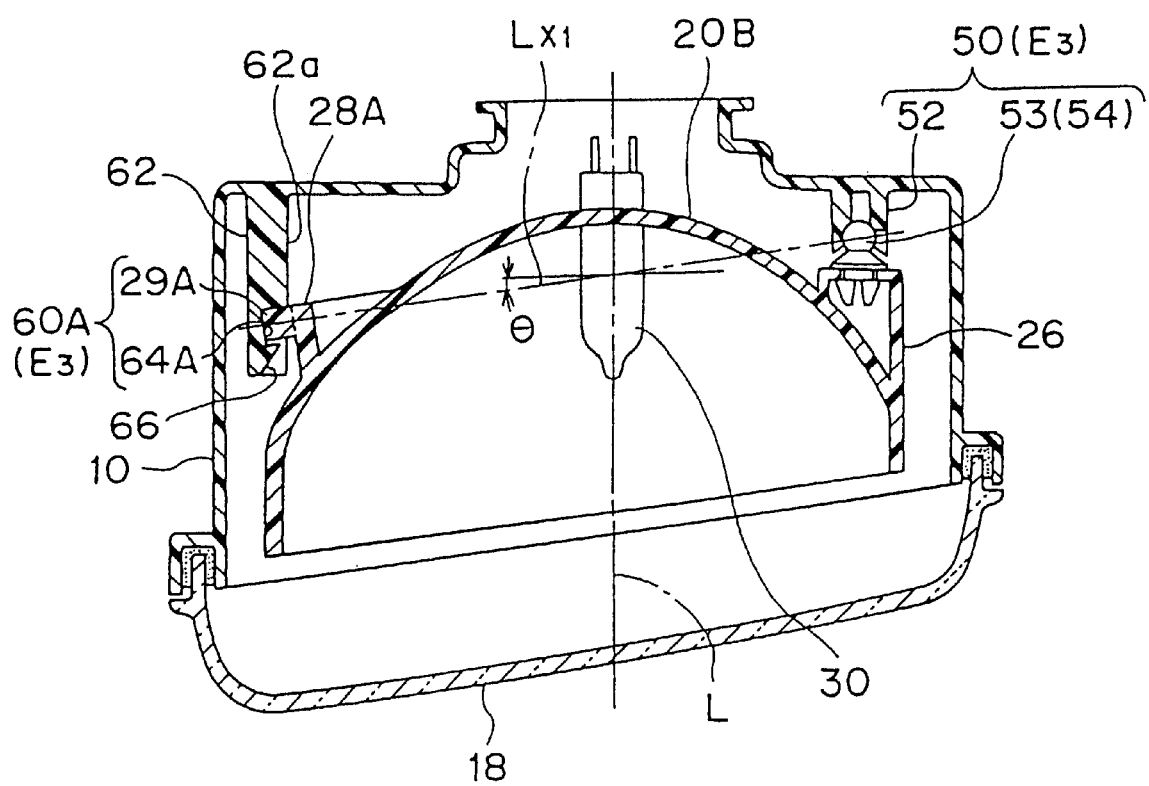
FIG. 7 is a horizontal sectional view of a vehicular head lamp according to the third embodiment of the present invention.

FIG. 7 shows a vehicular head lamp according to the third embodiment of the present invention. FIG. 7 corresponds to FIG. 3 of the first embodiment.

In the first and second embodiments, the aiming fulcrums 50 and 60 (50A and 60) that constitute the aiming mechanism $E_1$ ($E_2$) are disposed so that the horizontal tilt axis Lx is perpendicular to the optic axis L when the head lamp is viewed from above. In the third embodiment, however, the aiming fulcrums 50 and 60A that constitute an aiming mechanism $E_3$ are disposed so that the horizontal tilt axis $Lx_1$ is inclined by an angle of θ with respect to a location where the horizontal tilt axis $Lx_1$ is perpendicular to the optic axis L.

In addition, a cylindrical engagement convex portion 29A of the reflector 20 is formed so that the center axis thereof passes through the center of the ball portion 54 of the ball member 53 secured to the bracket 26. Likewise, a cylindrical engagement concave portion 64A is formed so that the center axis thereof passes through the center of the ball-receiving portion 52.

Accordingly, when the reflector 20 is mounted in the lamp body 10 by being supported by the aiming fulcrums 50 and 60A, the direction in which the engagement convex portion 29A and the engagement concave portion 64A extend coincides with the horizontal tilt axis $Lx_1$. As a result, tilting movements of the reflector 20 can be adjusted smoothly and thus aiming can be performed.

Further in the third embodiment, the direction, in which the bracket 28A that has the engagement convex portion 29A projects, is inclined with respect to the optic axis L. The direction, in which the cylindrical engagement convex portion 29A and the cylindrical engagement concave portion 64A extend, is also inclined by an angle of θ with respect to a location where they are perpendicular to the optic axis L. Accordingly, the third embodiment provides a structure that securely prevents the engagement convex portion 29A from deviating in a direction in which the reflector 20 is pulled out at the aiming fulcrum 60A (which is an engagement portion between the engagement convex portion 29A and the engagement concave portion 64A).

The other components of the third embodiment are the same as those of the first embodiment. Therefore, they are denoted by the same reference numerals as in the first embodiment and are not described.

Figure 8:
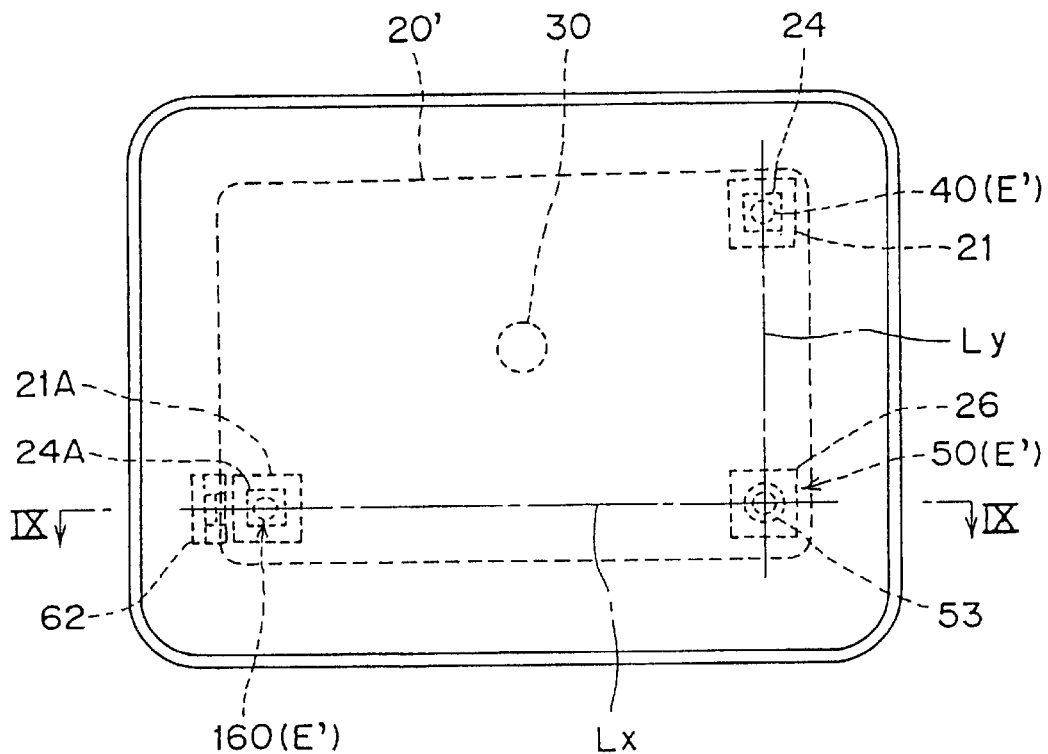
FIG. 8 is a front view of a head lamp that is different from the head lamp of the first embodiment only in aiming structure.
Figure 9:
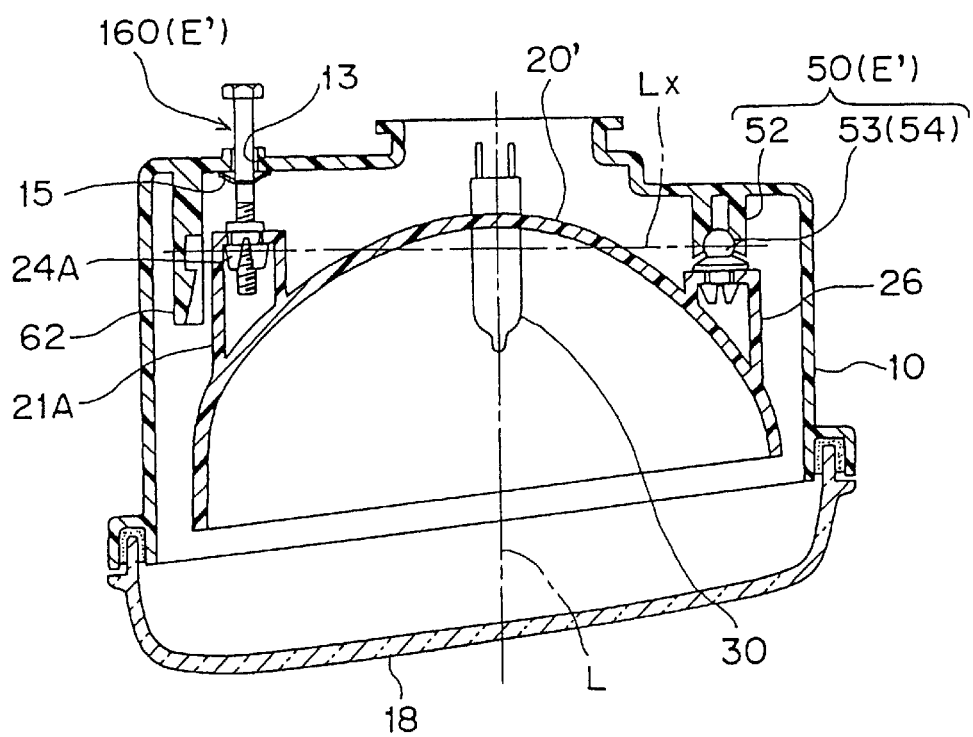
FIG. 9 is a horizontal sectional view of the head lamp taken along the line IX—IX in FIG. 8.

FIGS. 8 and 9 show a head lamp that has the same shape and light distribution characteristic as the head lamp of the first embodiment but is different therefrom in aiming specification. FIG. 8 is a front view of the head lamp, and FIG. 9 is a horizontal sectional view of the head lamp.

In the first through third embodiments, the aiming mechanisms $E_1$, $E_2$ and $E_3$ are composed of one aiming screw and two aiming fulcrums, and aiming is possible only in up-and-down (or vertical) directions. However, the aiming mechanism E' of the head lamp shown in FIGS. 8 and 9 is composed of two aiming screws 40 and 160 and one aiming fulcrum 50 so that aiming in both up-and-down (vertical) directions and left-and-right (horizontal) directions can be performed.

More specifically, a screw insertion hole 13 is provided in the vicinity of the interior of the elastic engagement strip 62 that is provided at the left lower corner portion in FIG. 8 of the lamp body 10. The aiming screw 160 is rotatably supported by the hole 13. The reference numeral 15 denotes a push-on fixture for holding the aiming screw 160 in position in fore-to-aft directions (top and bottom directions in FIG. 9) of the screw insertion hole 13.

In addition, a nut member 24A screwed to the tip end of the aiming screw 160 is secured to a bracket 21A formed on a lower left corner of a back face of a reflector 20'. In other words, instead of the bracket 28A that has the engagement convex portion 29 and is formed integrally with the back face of the reflector 20 in the first embodiment, the bracket 21A, that has no engagement convex portion, is formed integrally on the back face of the reflector 20'.

With the structure above, when the aiming screw 40 is rotated, the reflector 20' tilts about the horizontal tilt axis Lx that connects the aiming fulcrum (ball joint) 50 to the nut member 24A. When the aiming screw 160 is rotated, the reflector 20' tilts about a vertical tilt axis Ly that connects the aiming fulcrum (ball joint) 50 with the nut member 24.

The bracket 21A and the nut member 24A are provided at such predetermined locations that they do not interfere with the elastic engagement strip 62 when the reflector 20' tilts in the up-and-down directions and the left-and-right directions at the time of aiming.

Figure 10:
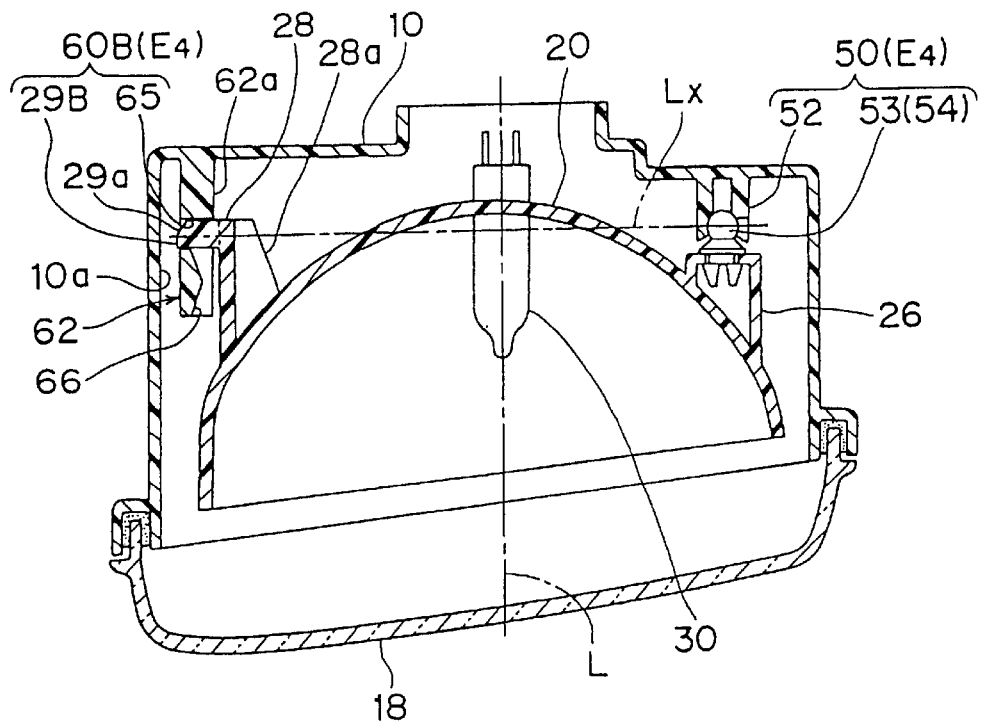
FIG. 10 is a horizontal sectional view of a vehicular head lamp according to the fourth embodiment of the present invention.
Figure 11:
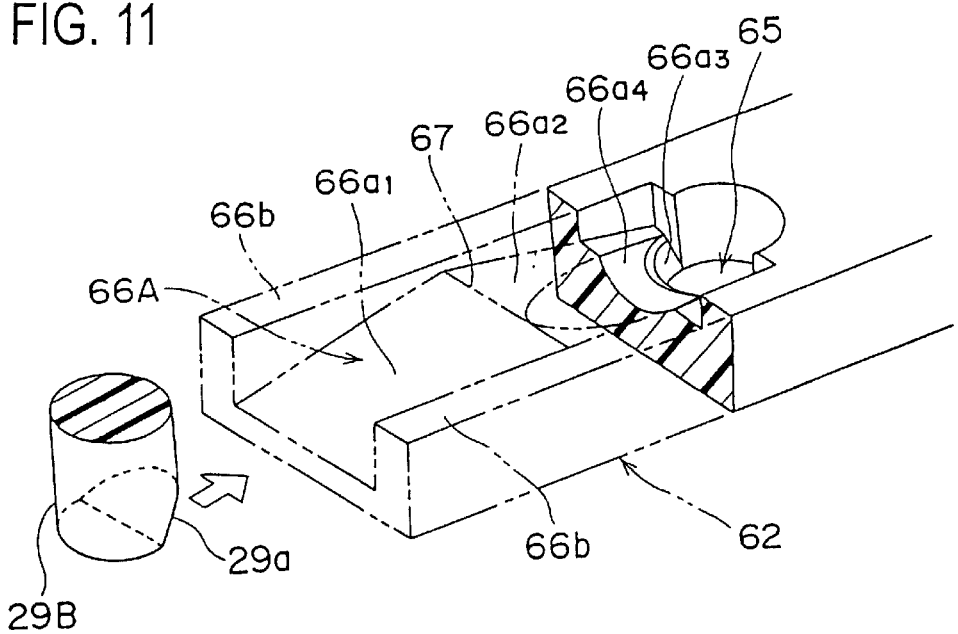
FIG. 11 is an enlarged perspective view that shows the engagement convex portion of a reflector and a circular hole which is an engagement concave portion of an elastic engagement strip of a lamp body.

FIGS. 10 through 13 show the fourth embodiment of the present invention. FIG. 10 corresponds to FIG. 3 of the first embodiment.

In the first through third embodiments, the engagement concave portion 64, which the engagement convex portion 29 of the reflector 20 can engage, is formed in the elastic engagement strip 62 of the lamp body 10. However, in the present fourth embodiment, instead of the engagement concave portion 64, an engagement circular hole 65 is opened in the elastic engagement strip 62 of the lamp body 10 so as to penetrate the elastic engagement strip 62.

Further, a tapered surface 29a is formed at a leading end portion of a cylindrical engagement convex portion 29B that constitutes an aiming fulcrum 60B of an aiming mechanism $E_4$. The tapered surface 29a reduces the amount of displacement of the elastic engagement strip 62 when the engagement convex portion 29B engages the circular hole 65 that serves as an engagement concave portion. Thus, the engagement convex portion 29B can be slid smoothly along a guide groove 66A upon engagement.

In addition, in the first through third embodiments, the engagement concave portions 64 and 64A, which serve as undercut portions when forming the lamp body, are formed using a slide mold. However, in the fourth embodiment, the circular hole 65 that serves as the engagement concave portion can be formed without using the slide mold.

More specifically, the guide groove 66A is composed of a tip end-side tapered surface $66a_1$, and a circular hole-side tapered surface $66a_2$. The tip endside tapered surface $66a_1$ smoothly guides the engagement convex portion 29B into a space between a pair of horizontal guide portions 66b. The circular hole-side tapered surface $66a_2$ makes it easy to draw out a forming convex portion 75 from the circular hole 65 that serves as the undercut portion when forming the lamp body 10. The reference numeral 67 denotes an edge line that separates the tapered surfaces $66a_1$, $66a_2$ from each other.

Furthermore, a tapered arcuate face $66a_3$ is formed on a peripheral portion of a reverse tapered surface $66a_2$ of the circular hole 65. A tapered recess $66a_4$, which has an arcuate cross-section and leads to the tapered arcuate face $66a_3$, is formed in a central portion in the width direction of the reverse tapered surface $66a_2$. This structure makes it possible to smoothly and less forcibly draw out the convex portion 75, which is for forming the circular hole, from the circular hole 65 formed in the elastic engagement strip 62 of the lamp body 10 that has been molded.

Figure 12:
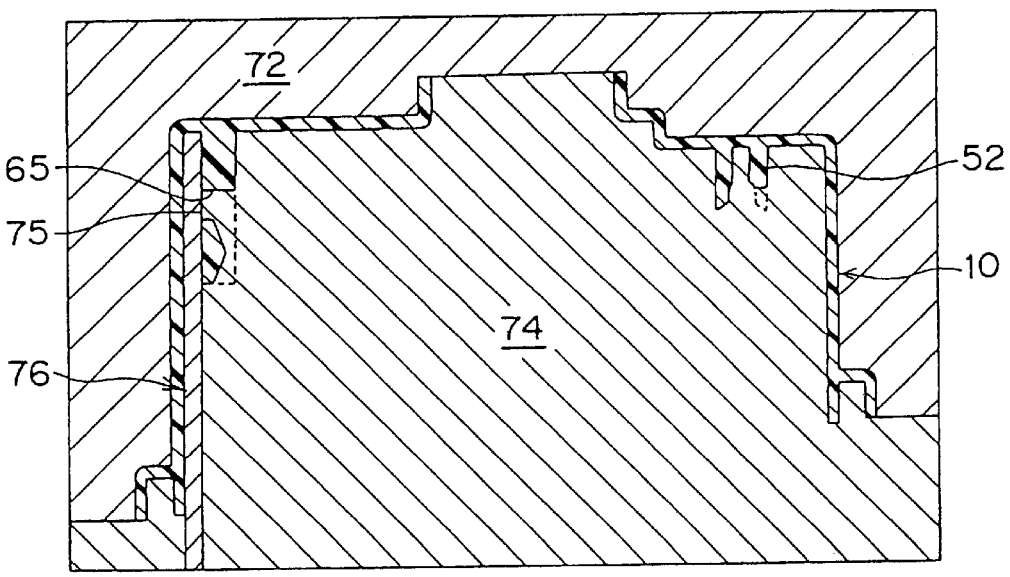
FIG. 12 is a sectional view of a mold for forming a lamp body.

FIG. 12 shows a cross-section of a mold for forming the lamp body 10 of the fourth embodiment that is shown in FIG. 10.

The reference numeral 72 denotes an upper mold for forming the exterior of the lamp body 10, and the reference numeral 74 denotes a lower mold for forming the interior of the lamp body 10. The lower mold 74 is provided with a parting mold 76 for forming a space between the elastic engagement strip 62 and the side wall 10a of the lamp body. Also, the lower mold 74 is provided with the convex portion 75 for forming the circular hole 65 of the elastic engagement strip 62. The convex portion 75 serves as an undercut portion when forming the lamp body 10.

Figure 13:
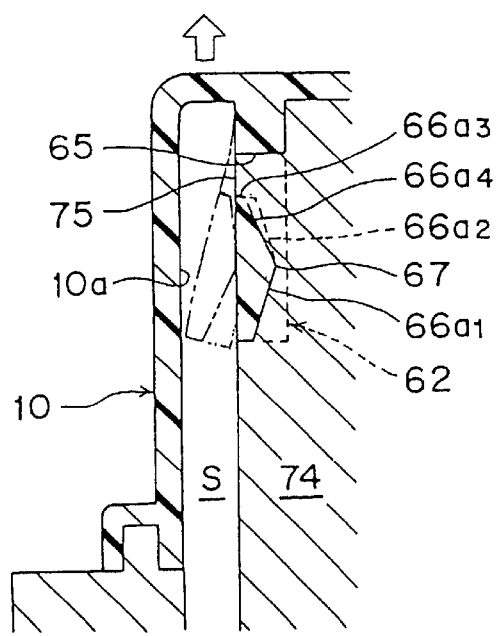
FIG. 13 is an explanatory illustration that shows how a circular hole forming convex portion is forcibly drawn out from the circular hole that serves as an undercut portion when forming the lamp body.

In order to form the lamp body 10, as shown in FIG. 12, injection mold is performed with the upper and lower molds 72 and 74 clamped together. Then, in order to separate the formed lamp body 10 from the molds, the upper mold 72 is first removed from the lower mold 74. The parting mold 76 is then drawn out downwards in FIG. 12, whereby a gap S is formed between the elastic engagement strip 62 and the side wall 10a of the lamp body as shown in FIG. 13. Next, a knocking mechanism (not shown) disposed in the lower mold 74 is used so as to knock the lamp body 10 upward. Then, the tapered arcuate face 66a is pressed onto the convex portion 75 for forming the circular hole, and the elastic engagement strip 62 is deformed as indicated by the imaginary (two-dot) line in FIG. 13. The forming convex portion 75 then slides along the tapered recess $66a_4$ of the reverse tapered surface $66a_2$ and moves to the tip end-side tapered surface $66a_1$ over an edge line 67. Then, the forming convex portion 75 is brought so as to be drawn out from the circular hole 65, and the lamp body 10, a molded body, is separated from the lower mold 74.

The other components of the fourth embodiment are the same as those of the first embodiment. Therefore, they are denoted by the same reference numerals as in the first embodiment and are not described.

In the first through fourth embodiments, the aiming fulcrums 60, 50A, 60A and 60B of the aiming mechanism that performs aiming only in the up-and-down directions are composed of the engagement concave portions 64 and 64A and the circular hole 65 in the elastic engagement strip 62 formed integrally in the lamp body 10 and of the engagement convex portions 29, 29A and 29B of the reflector 20. However, the structure of the aiming fulcrums of the present invention can also be applied to aiming fulcrums of an aiming mechanism that performs aiming in the left-and-right directions.

Furthermore, in the above embodiments, a vehicular head lamp is described. However, the present invention is not limited to head lamps, and it can be also applied to other vehicular lamps such as fog lamps.

As is apparent from the foregoing description, according to the vehicular head lamp of the present invention, the reflector will not come off at the aiming fulcrum by itself. It is, therefore, possible to suitably perform aiming over a long period of time.

The structure of the aiming fulcrum of the aiming mechanism is simple, and the number of parts required for the aiming mechanism can be reduced. Therefore, the costs of the aiming mechanism are low, and consequently, the costs of the vehicular head lamp can be reduced.

Further, it is ensured that the reflector can smoothly rotate at an aiming point. Thus, aiming can be performed accurately and easily.

In addition, the bending moment, which is applied to the elastic engagement strip when the engagement convex portion engages the engagement concave portion, is small. Accordingly, the elastic engagement strip less likely to break, and the durability of the aiming point is enhanced. Since the engagement convex portion can be engaged with the engagement concave portion smoothly and securely, the mounting operation of the reflector is facilitated.

Furthermore, when mounting the reflector in the lamp body, the reflector does not interfere with the inner wall of the lamp body. Thus, the reflector can be mounted smoothly.

Also, when the engagement convex portion is to be engaged with the engagement concave portion, the elastic engagement strip does not receive an excessively large load that may cause breakage thereof. Thus, the durability of the aiming fulcrum is enhanced.

Furthermore, the number of parts of the aiming fulcrum component is reduced, and consequently, the number of parts of the aiming mechanism component is small. Thus, the mounting operation of the reflector can be facilitated, and the costs of the vehicular head lamp is low.

What is claimed is:

1. A vehicular head lamp wherein a reflector to which a light source is installed is tiltably supported in a synthetic resin lamp body by an aiming mechanism interposed between said reflector and said lamp body, characterised in that:

said lamp body is provided on an interior thereof with a projected elastic engagement strip, said elastic engagement strop being provided on a side surface thereof with n engagement concave portion, said engagement concave portion extending in a direction substantially perpendicular to a direction in which said reflector is inserted into said lamp body when said reflector is mounted in said lamp body, and said reflector is provided on a back face thereof with an engagement convex portion that can engage said engagement concave portion of said lamp body; and wherein:

said engagement concave portion and said engagement convex portion are brought into an engagement so as to constitute an aiming fulcrum of said aiming mechanism; said engagement concave portion is a cylindrically shaped hole that extends in said direction substantially perpendicular to said direction in which said elastic engagement strip projects, said engagement concave portion is a projecting cylindrical shape that fits in said engagement concave portion, an open tapered guide groove for guiding said engagement concave portion into said engagement concave portion is provided at a tip end of said elastic engagement strip, and said engagement concave portion is provided on a first side surface of said elastic engagement strip, said first side surface being opposite to a second side surface that faces an inner wall of said lamp body.

2. The vehicular head lamp according to claim 1, characterized in that said elastic engagement strip extends in close proximity to an inner wall of said lamp body.

3. The vehicular head lamp according to claim 1, characterized in that said aiming mechanism is composed of one screw and two aiming fulcrums, and at least one of said two aiming fulcrums is comprised of said engagement convex portion and said engagement concave portion.

* * * * *